Dec. 19, 1961 R. T. FISHER 3,013,922
MANUFACTURE OF PLASTIC ARTICLES HAVING SPACED
SHELLS WITH REINFORCED FOAM FILLING
Filed March 27, 1957
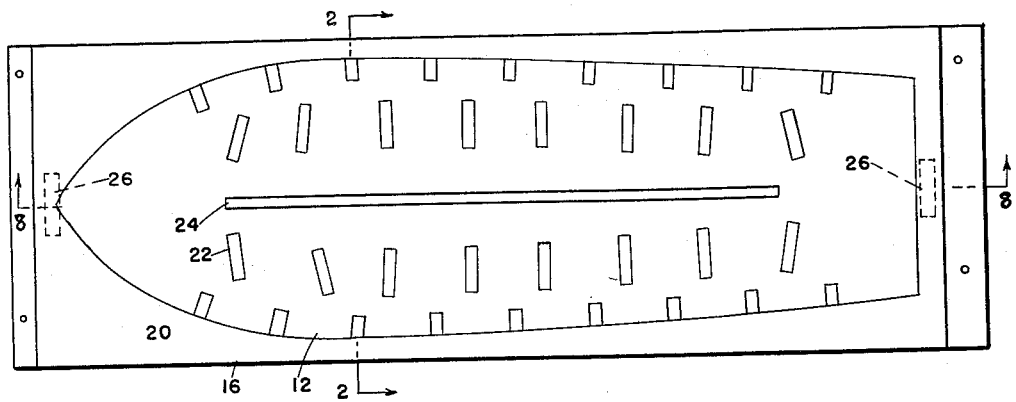
FIG.1
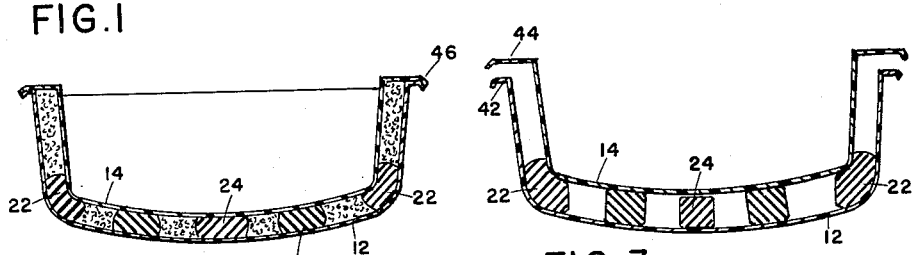
FIG.2  FIG.3
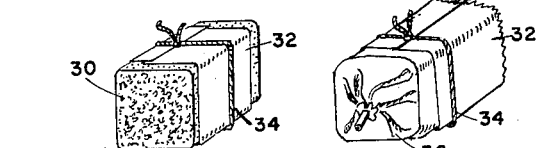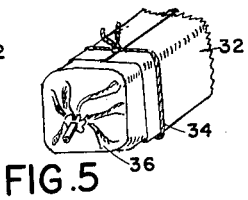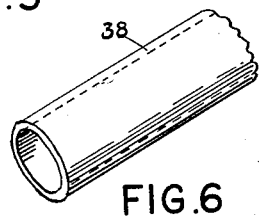
FIG.4  FIG.5  FIG.6
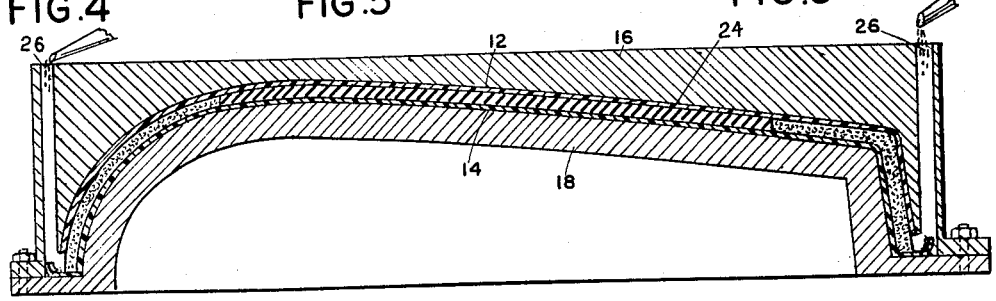
FIG.7
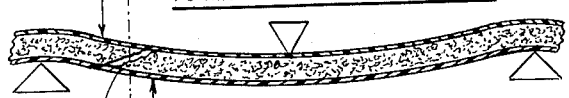
Foam failure due to Shear Strain.
FIG.8
INVENTOR.
Richard T. Fisher.
BY *Moses, Nolte & Nolte*
ATTORNEYS

United States Patent Office 3,013,922
Patented Dec. 19, 1961

3,013,922
MANUFACTURE OF PLASTIC ARTICLES HAVING SPACED SHELLS WITH REINFORCED FOAM FILLING
Richard T. Fisher, Cohasset, Mass., assignor to The Fisher Pierce Co., Inc., a corporation of Massachusetts
Filed Mar. 27, 1957, Ser. No. 648,966
2 Claims. (Cl. 18—59)

This invention relates to the manufacture of molded plastic articles having outer surfaces or shells of hard plastic backed up or filled with bodies of very light, settable plastic foam. The invention is particularly applicable for the manufacture of structures of some size, such as boat hulls, aeroplane parts, wall panels, or articles of furniture in which substantial stresses may be developed in use. The hard outer shells of the articles are usually formed of a hard setting plastic reinforced with fibers such as glass fibers in the form of mats or batts, sprinkled chopped fibers, or bundles of long fibers, etc. Such articles have been made and have been found to be very resistant to compressive strains, and of adequate local hardness. Examples of such structures and of methods of making the same are disclosed in my United States patent applications Serial Numbers 498,091, filed March 30, 1955, and 606,103, filed August 24, 1956, both now abandoned.

Difficulty has sometimes been encountered, however, in the use of structures of this character where the structures are subjected to twisting or bending stresses which produce shear stresses upon the foam filler. In some cases, such stresses result in failure due to shear fracture with consequent loss of strength and rigidity in the structural element as a whole. It is the primary object of the present invention to provide an effective means and method for reinforcing the structure against failures due to such cause. The desired result is accomplished by providing reinforcing bodies suitably spaced between the hard outer shells, these bodies being incorporated during the process of manufacture and being preferably of such nature as to be cured along with the curing of the shell and foam filler, so that a fully integrated structure results.

It is also an object of the invention to provide reinforcing elements which are of a flexible or yielding character before being cured, so that they may be readily introduced at the time that the structure is being assembled, and need not be shaped or fitted to exact size. For example, if a structure such as a boat hull is being formed, the reinforced shell members are laid up on the surfaces of male and female mold members, and the flexible reinforcing elements are then placed on one of the shells, and the mold members carrying the shells are then brought together, leaving a space between the shells to be filled with the foaming compound. As the reinforcing bodies are at this time in flexible and yielding condition, they will be more or less compressed as the mold elements are brought together, depending upon the spacing between the shells which may vary from point to point, and is also subject to some variation due to inequality of thickness of the shells. The flexibility of the reinforcing elements enables them to yield as required, and does not necessitate that such elements be shaped to close tolerances. The reinforcing elements are also so placed between the shells as to permit the foaming compound to pass around and between such elements and completely fill the space between the shells. The entire article is then cured and the foaming compound produces substantial pressure between the shells and around the reinforcing bodies, pressing them and holding them in position until the shells, filling and reinforcing bodies or shear braces are fully cured and rendered rigid, preferably at a single curing operation.

In the accompanying drawings illustrating certain preferred embodiments of the invention:

FIG. 1 is a plan view of the female member of a boat mold having a shell therein on which are placed a plurality of reinforcing bodies or shear braces;

FIG. 2 is a transverse vertical section at line 2—2 of FIG. 1 showing in section a completed hull with inner and outer shells, shear braces and foam plastic filling;

FIG. 3 is a similar section showing the inner and outer shells and shear braces before the shells have been finally brought into final position by closing of the mold elements;

FIG. 4 is a perspective view of one construction of reinforcing body or shear brace;

FIG. 5 is a perspective view of another brace construction;

FIG. 6 is a fragmentary perspective of another brace construction;

FIG. 7 is a longitudinal section of a mold with the hull structure therein; and

FIG. 8 is a diagrammatic view illustrating the phenomenon of foam failure due to shear strain produced by characteristic double curvature.

Referring to the drawings in detail, the invention is illustrated as applied to the manufacture of boat hulls. The hull consists of an outer shell 12 and an inner shell 14, each composed of a hard setting, rigid plastic usually reinforced with fibers such as glass fiber fabric or batts, or fiber used in other forms. The outer shell 12 is laid up in a female mold 16, and the inner shell is laid up on the surface of a male mold 18. Before the coated mold members are brought together, reinforcing bodies or shear braces such as 20, 22 and 24 are suitably spaced on one of the shells, preferably by being laid in the outer shell which is supported in the cavity of the female mold. The mold parts are then assembled, the flexible shear braces occupying space between the shells, as shown in FIG. 3. In order to be certain that the braces completely fill the space between the shells, they are usually made of somewhat greater thickness than such spaces, so that when the shells are forced into final position, as shown in FIGS. 2 and 7, by the locking up of the mold, their reinforcing bodies will be somewhat compressed and may yield laterally sufficiently to permit this to take place. The foaming compound is now introduced through suitable gates such as 26, it being in sufficiently liquid form to be poured or squirted in. The foaming compound quickly expands, owing to its chemical nature, either with or without the application of external heat. The expanding foam completely fills the space between the shells and around the reinforcing bodies or shear braces, and sets up into a rigid but very porous foam filling 28. Such filling supports the shells against compressive strains, denting or local deformation, and it also supports and compresses the reinforcing bodies or shear braces laterally. At the same time the supports or shear braces tie the shells together at short intervals, and thereby prevent the deformation of the shells which would otherwise result in shear stresses which would produce cracks or failures of the foam filling. The structure as a whole thus possesses great strength and rigidity while at the same time preserving the advantages of being able to embody an exceedingly light and porous foam filling. The resulting structure is, therefore, extremely light, as well as very strong.

The reinforcing bodies or shear braces may be of various forms. A preferred form is that shown in FIG. 4, in which a body of sponge plastic 30 of suitable shape is provided, this being preferably wrapped in one or more layers of glass fiber mat 32 wrapped around the body 30 and secured in place by one or more binders 34, which may be rubber bands, cords or wires. Just before the reinforcing body is placed in the uncured plastic shell, it is preferably sprayed with a plastic solution compatible with the plastic of the shell, so that when the sprayed body is applied, it will adhere in position to the shell, and in the final structure it will cure at the same time that the shell is cured, so that it will be firmly united thereto.

Another form of reinforcing body is shown in FIG. 5, this comprising an inflated bag 36 of rubber, plastic or paper, which is also preferably covered with a layer 32 of plastic and glass reinforcement. This is used the same way as the body shown in FIG. 4.

Another form of shear brace is shown in FIG. 6, this comprising a tube 38 of elastic plastic, which may, if desired, incorporate reinforcing fibers, or which may have a mat of reinforcing fibers wrapped around the same as in FIGS. 4 and 5. The tube will flatten out more or less, so as to conform to the dimensions of the space between the shells of the structure.

FIG. 8 illustrates diagrammatically how a laminated structure having a foam filling will tend to fail due to shear strain when subjected to a bending stress. The point of failure is indicated at 40.

In forming a structure such as a boat hull, for example, the inner and outer shells are preferably provided at their margins with flanges 42, 44, as shown in FIG. 3. The flange 44 is made wide enough to cover the space between the shells, and when the shells are brought together and cured the margins of the flanges 42 and 44 are welded together preferably with a bead or curl as indicated at 46 in FIG. 2. This forms a desirable finish for the hull, and the flange 44 completely closes and seals in the foam filling.

Any suitable plastic compounds may be employed for the structure. For example, the shell may be formed of a hard setting resin of polyester type, reinforced with glass fibers. The foam filling may be of an alkyd isocyanate type, or a urethane type. The fillers 30 of the shear braces shown in FIG. 4 may be formed of the same ingredients used to form the foam filler between the shells. Such material may be partially cured into an elastic sponge and cut into blocks before being wrapped with the reinforcing layer 32. As previously stated, the blocks are preferably sprayed with a catalyzed plastic just before being positioned and compressed between the shells. Any other suitable spongy material, such as sponge rubber could be used under suitable conditions. The uncured plastic sprayed layer 32 will become firmly welded to the shells, and will also set into more or less rigid condition. The sponging block 30 may also be of such composition as to become rigid during the curing process. This, however, not essential as the presence of small pieces of flexible foam in a sandwich consisting otherwise of rigid foam confined between the rigid shells does not harm because in these small areas the skin is excessively thick where the brace has been attached and adequate local stiffness exists.

The foaming filler material may be of such nature that it will generate much heat as well as pressure as it sets, so that no external source of heat is necessary for the curing of either the core or shell compounds. However, any suitable means for heating the pressure mold may be provided if needed.

I claim:

1. The process of manufacturing rigid self-sustaining structures of plastic having outer shell layers of hard setting dense plastic reinforced with fiber reinforcement and a central body of hard setting light foam plastic reinforced against failure from shear strains which comprises the following steps; applying shell coatings of glass fiber combined with uncured plastic to mold surfaces of irregular shape, applying deformable bodies coated with uncured plastic compatible with the plastic of the mold coatings at spaced intervals to the shell coating on at least one of the mold surfaces so as to form islands having unobstructed passageways between them, the islands being thicker than the space between the shell coatings when the mold is closed, introducing a foam forming plastic mixture, closing the mold and at the same time compressing and deforming the islands to such extent as may be necessary to permit the mold to close, permitting the foam forming mixture to expand and fill the spaces between the mold parts and around the spaced deformable islands, allowing the shell coatings, islands, and plastic foam to cure to a rigid substantially integrated mass, and removing the finished article from the mold.

2. The process as claimed in claim 1 in which the shear brace islands after deformation are wider than the distance between the shells at points where the islands are located.

References Cited in the file of this patent

UNITED STATES PATENTS

| | | |
|---|---|---|
| 1,457,826 | Egerton | June 5, 1923 |
| 2,029,048 | Atwood | Jan. 28, 1936 |
| 2,376,653 | Boyer | May 22, 1945 |
| 2,377,846 | Dreyfus | June 5, 1945 |
| 2,381,631 | Waring | Aug. 7, 1945 |
| 2,454,719 | Scogland | Nov. 23, 1948 |
| 2,482,798 | Rheinfrank et al. | Sept. 27, 1949 |
| 2,519,036 | Ford et al. | Aug. 15, 1950 |
| 2,706,311 | Durst | Apr. 19, 1955 |
| 2,728,702 | Simon et al. | Dec. 27, 1955 |
| 2,744,042 | Pace | May 1, 1956 |
| 2,755,216 | Lemons | July 17, 1956 |
| 2,767,461 | Lebold et al. | Oct. 23, 1956 |
| 2,773,792 | Nebesar | Dec. 11, 1956 |
| 2,855,021 | Hoppe | Oct. 7, 1958 |

FOREIGN PATENTS

| | | |
|---|---|---|
| 1,082,060 | France | June 16, 1954 |